UNITED STATES PATENT OFFICE.

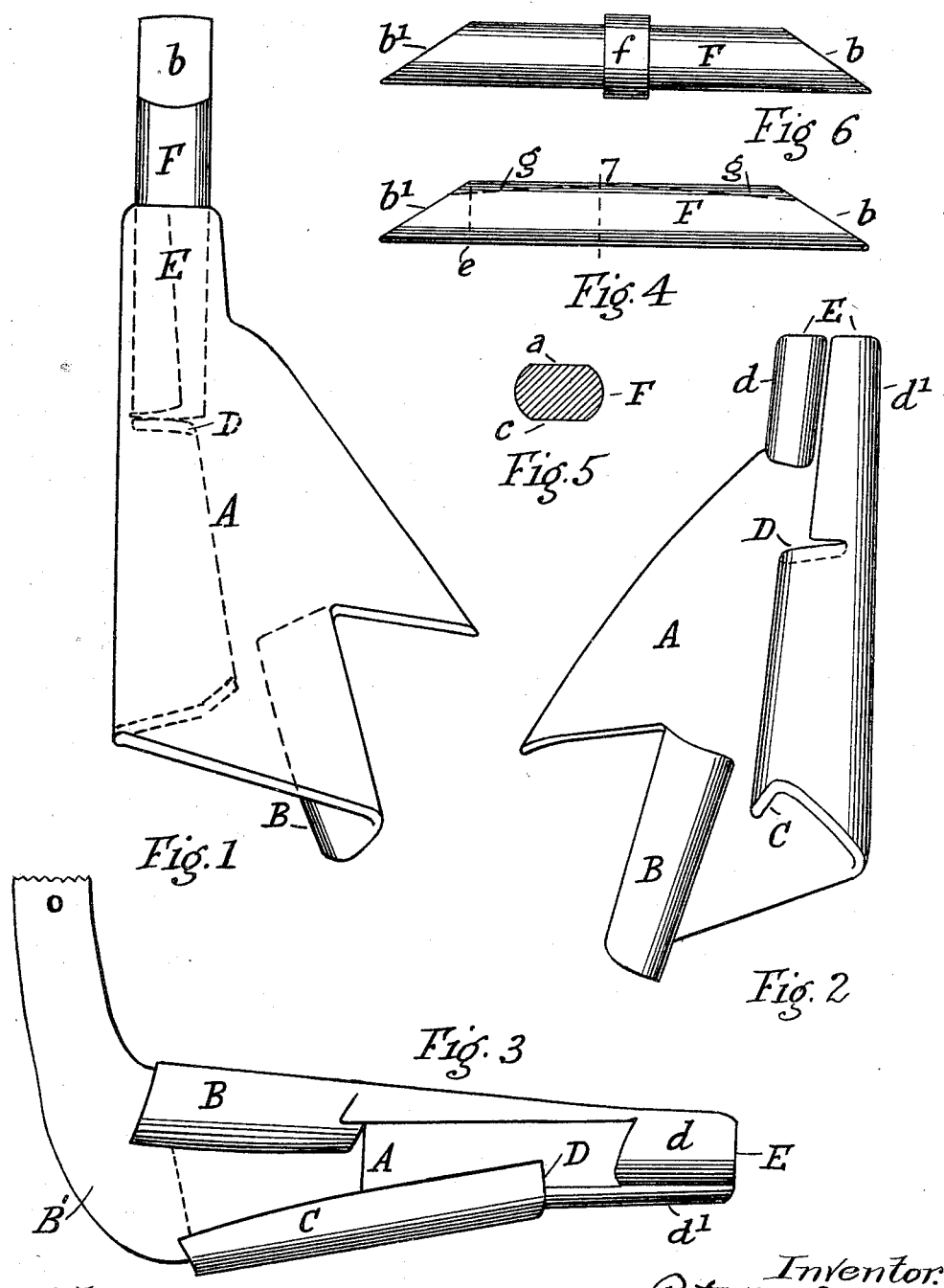

PETER McDERMOTT, OF DRYSDALE, VICTORIA, AUSTRALIA, ASSIGNOR OF ONE-HALF TO THOMAS McDERMOTT, OF DRYSDALE, AUSTRALIA.

PLOWSHARE.

1,005,729.      Specification of Letters Patent.      Patented Oct. 10, 1911.

Application filed April 7, 1911. Serial No. 619,604.

*To all whom it may concern:*

Be it known that I, PETER McDERMOTT, a subject of the King of Great Britain and Ireland, &c., residing at Drysdale, in the State of Victoria, Commonwealth of Australia, have invented certain new and useful Improvements in Plowshares and Points Therefor; and I do hereby declare the following to be a full, clear, and exact description of the invention, such as will enable others skilled in the art to which it appertains to make and use the same.

Many farmers find that in view of the renewals needed the cost of the shares of plows and like agricultural implements is objectionably large; as when ordinary share points wear off, or break, new shares are necessary although the back parts remain good. I use a plow share having an independent removable point of exceptional strength and exceptionally slow wearing nature so that its life is long; it does not break and it is cheap, and easily fitted to the rest of the share. Thus as a whole the share is in at least, two parts, but at times the points will need renewal. These points vary as to material, length, diameter, cross section, and end detail. Their fronts are chisel edged, or of other form to readily pierce hard earth with any desired downward working set as required when plowing.

A suitable material, especially for plain chisel ended points is oval tool steel which I cut to length from a bar, shape or sharpen the piece at both ends (or at one) and fit in a socket in the share which is so made that the flat sides of the piece prevent it turning during work. Such points will of course wear blunt and can be reversed; and when they need to be resharpened the latter can be done rapidly.

I make the shares of suitable steel plate or metal, each with a front socket adapted to receive and hold the piece I term a point. Each share is also in some cases bent, or cut and bent so as to form a socket for connection of the implement foot, or other suitable part of the plow located at the share back.

The drawings herewith illustrate suitable construction.

Figure 1 is a view of the share top, Fig. 2 of its bottom, and Fig. 3 of its side, a point being shown in place in Fig. 1. Fig. 4 shows my preferred point which is chisel ended at both extremities and reversible in use. Fig. 5 shows a transverse section at line 7 in Fig. 4, and Fig. 6 is a modified form of reversible point in side view.

The illustrated steel share A has cut and bent to the desired shape, two parts or edges B and C inclined toward one another to make a socket for the implement foot B' or other suitable member of the plow as aforesaid. The fore end of part C is positioned with an edge D or projection bent in to form a butt or stop limiting backward movement of the point, when the point socket next mentioned allows the point to be inserted so far. Socket butt D may be independent of the back part of the shares, as the implement connecting means may be of any suitable kind, while retaining my point arrangements.

To receive the point the share front is shaped as a socket by having one or more curved or bent sides or edges $d$, $d^1$. This point socket as a whole is marked E, and may vary in detail, but that illustrated is simple and effective to hold the point which as a whole is marked F; in Fig. 5 its flat top $a$ and base $c$ are shown, and in Figs. 1 and 4 its chisel shaped ends $b$, $b^1$.

While keeping the point reversible, the front and back sharpenings may differ as to form at will, to suit special work or (as a modification—not preferred) the rear end may be blunt as dotted at $e$. The rear is adapted to bear against stop D, and knocking on the point rear frees it from the socket when desired. End D is located so close to the share front, that only a small length of steel bar is discarded when the point is eventually worn out.

The fixing of the point in the share is effected in some cases by reducing the part or parts to enter the socket as compared with the middle part, or by adding a fixed or adjustable collar $f$ or any suitable projections to the body of the point. Part $f$ would then butt against the share front, the latter acting as a stop. Or the point has in some cases at one or both ends a taper as dotted at $g$ to jam in the socket E which is then tapered to correspond. The stop in each case is such as to prevent the point being forced too far back in the socket, while preventing the point turning and yet allowing of easy knocking of it out.

My forms permit of economy, by allowing the use of points which will wear down till of only a short length in front of socket E. The point during plowing holds in the socket securely by reason of the pressure of the ground against its fore end. The point is inserted by pushing its rear through the socket front.

What I claim as my invention is:—

1. In a plow share, the combination of a plate having a cutting edge, a portion of the cutting edge and the opposite edge being turned inwardly to form a socket, a point fitted into the socket, and a part projecting from said opposite side rearward of the socket to act as a stop for the point, substantially as described.

2. In a plow share, the combination of a plate having a cutting edge, the rearward portion of the cutting edge and the opposite edge being turned inwardly to form a site for securing said plate to the foot of the plow, and means for removably securing a point to the plate, substantially as described.

3. In a plow share, the combination of a plate having a cutting edge, the forward portion of the cutting edge and the opposite edge of the plate being turned inwardly to form a socket, a point fitted into the socket, said opposite edge having a part rearward of the socket extending inwardly to form a stop for the point, and means for securing the plate to the foot of a plow, substantially as described.

4. In a plow share, the combination of a plate having a cutting edge, the forward portion of the cutting edge and the opposite edge of the plate being turned inwardly to form a socket, a point fitted into the socket, said opposite edge having a part rearward of the socket extending farther inwardly to form a stop for the point, and the rear part of the cutting edge being turned inwardly to form with said rearward portion of the opposite edge, a means for securing said plate to the foot of a plow, substantially as described.

5. In a plow share, the combination of a plate having a cutting edge, the forward portion of the cutting edge and the opposite edge of the plate being rolled inwardly to form a tapering socket, a point, the point being provided with a longitudinal tapering portion adapted to be jammed into said socket, said opposite edge having a part rearward of the socket extending inwardly to form a stop for the point, and means for securing the plate to the foot of a plow, substantially as described.

6. In a plow share, the combination of a plate having a cutting edge, the forward portion of the cutting edge and the opposite edge of the plate being rolled inwardly to form a tapering socket, a double pointed bar, the double pointed bar being provided with longitudinal tapering portions adapted to be jammed into said socket, said opposite edge having a part rearward of the socket extending inwardly to form a stop for the point, and the rear part of the cutting edge being turned inwardly to form with said rearward portion of the opposite edge a tapering socket for securing said plate to the foot of the plow, substantially as described.

In witness whereof I have hereunto set my hand in the presence of two witnesses.

PETER McDERMOTT.

Witnesses:
GEORGE G. TERRI,
BEATRICE M. LOWE.

Copies of this patent may be obtained for five cents each, by addressing the "Commissioner of Patents, Washington, D. C."